United States Patent [19]

Tashiro et al.

[11] Patent Number: 4,983,150
[45] Date of Patent: Jan. 8, 1991

[54] DIFFERENTIAL GEAR APPARATUS WITH DIFFERENTIAL LIMITATION MECHANISM

[75] Inventors: Takao Tashiro; Osamu Ishikawa, both of Tochigi, Japan

[73] Assignee: Viscodrive Japan Ltd., Japan

[21] Appl. No.: 420,752

[22] Filed: Oct. 12, 1989

[30] Foreign Application Priority Data

Oct. 28, 1988 [JP] Japan .................................. 63-270996

[51] Int. Cl.$^5$ .............................................. F16H 1/44
[52] U.S. Cl. .......................................... 475/85; 475/89
[58] Field of Search .................................... 475/85, 89

[56] References Cited

U.S. PATENT DOCUMENTS

| | | | |
|---|---|---|---|
| 4,771,653 | 9/1988 | Teraoka | 475/85 |
| 4,860,850 | 8/1989 | Takahashi | 475/85 X |

FOREIGN PATENT DOCUMENTS

| | | |
|---|---|---|
| 0321848 | 6/1989 | European Pat. Off. . |
| 3703165 | 10/1987 | Fed. Rep. of Germany . |
| 776210 | 10/1934 | France . |
| 62-85748 | 1/1987 | Japan . |
| 8404788 | 12/1984 | PCT Int'l Appl. . |

*Primary Examiner*—Dirk Wright
*Attorney, Agent, or Firm*—Samuels, Gauthier & Stevens

[57] ABSTRACT

In a differential gear apparatus provided with a differential limitation mechanism, to prevent a washer interposed between the differential case and the coupling case from being seized by heat when viscous fluid is sheared into high temperature and pressure, the coupling case is formed integral with a first output shaft to increase rigidity of the coupling case. Further, it is preferable to form an inner hub integral with a second output shaft to increase rigidity of the inner hub.

3 Claims, 2 Drawing Sheets

DIFFERENTIAL GEAR APPARATUS WITH DIFFERENTIAL LIMITATION MECHANISM

BACKGROUND OF THE INVENTION

1. Field of the Invention

The present invention relates to a differential gear apparatus provided with a differential limitation mechanism, and more specifically to a structure of the differential gear apparatus of this type.

2. Description of the Prior Art

When an automotive vehicle changes its travelling direction or travels along a curve, an appropriate differential motion is required for the right and left vehicle wheels via a differential gear apparatus for providing smooth vehicle travelling. However, when the vehicle is running on a road whose surface friction coefficient is small such as a muddy road and therefore one of the right and left vehicle wheels slips, since no drive power is transmitted to the other of the two vehicle wheels because of its construction, the vehicle cannot get out of the muddy road. To overcome the above-mentioned problem, a differential gear apparatus provided with a differential limitation mechanism has been proposed, in which when one of the vehicle wheels slips on a muddy road and therefore a differential operation is produced between the two vehicle wheels, the differential operation is limited to drive the other non-slipping wheel for facilitation of vehicle's getting out of a muddy road.

FIG. 1 shows one of these prior-art differential gear apparatus provided with a differential limitation mechanism, by way of example, which is disclosed by the same applicant in Japanese Published Unexamined (Kokai) Utility Model appli. No. 62-85748. In FIG. 1, a ring gear (not shown) is fitted to a differential case 101 of the differential gear apparatus. With this ring gear, a drive pinion gear (not shown) is engaged to transmit a rotative power from an internal combustion engine to this ring gear. The differential case 101 is formed with an engage groove 102 engaged with a pinion shaft 103. A pinion gear 104 is rotatably supported by the pinion shaft 103, and in mesh with a pair of side gears 105a and 105b. The side gear 105a is spline-coupled to a right side wheel drive shaft 106 arranged coaxially with a left side wheel drive shaft 107. Between the right side wheel drive shaft 106 and the left side wheel drive shaft 107, a viscous coupling 108 housed within a differential case 101 is disposed. The viscous coupling 108 comprises a coupling case 109, a hub member 110, etc., and a working chamber 111 is partitioned by the coupling case 109 and the hub member 110. The working chamber 111 is filled with a viscous fluid and provided with first resistance plates 112 circumferentially splined coupled to the coupling case 109 and second resistance plates 113 also circumferentially spline coupled to the hub member 110. Further, the coupling case 109 is spline coupled to the left side wheel drive shaft 107 and the hub member 110 is spline coupled to the right side wheel drive shaft 106. Furthermore, a washer 114 is interposed between the coupling case 109 and the differential case 101.

When a differential operation is produced between the left side wheel drive shaft 107 and the right side wheel drive shaft 106 on a muddy road, the viscous fluid is sheared between the first resistance plates 112 and the second resistance plates 113. Therefore, the differential operation is limited by a shearing resistance generated at the first resistance plates 112 and the second resistance plates 113, so that the vehicle is allowed to get out of a muddy road.

In the prior-art differential gear apparatus provided with a differential limitation mechanism as described above, however, when a differential operation is produced between the left side wheel drive wheel 107 and the right side wheel drive wheel 106 and therefore the viscous fluid is sheared by the first resistance plates 112 and the second resistance plates 113, the viscous fluid is heated and therefore expanded. Once the viscous fluid is expanded, since the coupling case 109 is elastically deformed into expansion, the washer 114 interposed between the differential case 101 and the coupling case 109 is urged against the differential case 101. Therefore, there exists a problem in that the washer 114 is seized by heat and therefore the differential case 101 and the coupling case 109 are not rotatable relative to each other.

SUMMARY OF THE INVENTION

With these problems in mind, therefore, it is the primary object of the present invention to provide a differential gear apparatus with a differential limitation mechanism, by which a washer interposed between a differential case and a left side wall member will not be seized even when the viscous fluid is heated into expansion.

To achieve the above-mentioned object, the differential gear apparatus with a differential limitation mechanism, according to the present invention, having a differential case (1) for receiving a rotative input power; a pinion gear (4) rotatably supported by the differential case via a pinion shaft (3); a pair of side gears (5,6) in mesh with the pinion gear; a coupling case (14) rotatable together with one of the side gears (6) to transmit rotative power to a first output shaft (8); an inner hub (10) disposed rotatably relative to the coupling case (14); a working chamber (16) partitioned by the inner hub (10) and the coupling case and filled with a viscous fluid; two sets of resistance plates (18,19) engaged with the coupling case and the inner hub, respectively; and a second output shaft (7) coupled to the other of the side gear (5), is characterized in that said coupling case is formed integral with said first output shaft to increase rigidity of said coupling case.

Further, it is preferable to form the inner hub integral with the second output shaft to increase rigidity of the inner hub.

When the first output shaft and the second output shaft rotate relative to each other and therefore the viscous fluid is sheared by the first resistance plates and the second resistance plates, the viscous fluid is heated and expanded, so that a high pressure is produced within the working chamber. In the present invention, however, since the first output shaft is formed integral with the coupling case, the coupling case will not be elastically formed into expansion. Therefore, when the coupling case is disposed within the differential case via a washer, the washer will not be urged against the differential case into heat seizure.

BRIEF DESCRIPTION OF THE DRAWINGS

The features and advantages of the differential gear apparatus provided with a differential limitation mechanism according to the present invention will be more clearly appreciated from the following description of the preferred embodiment of the invention taken in conjunction with the accompanying drawings in which.

DETAILED DESCRIPTION OF THE PREFERRED EMBODIMENT

The present invention will be disclosed hereinbelow with reference to the attached drawing.

Figure 1:
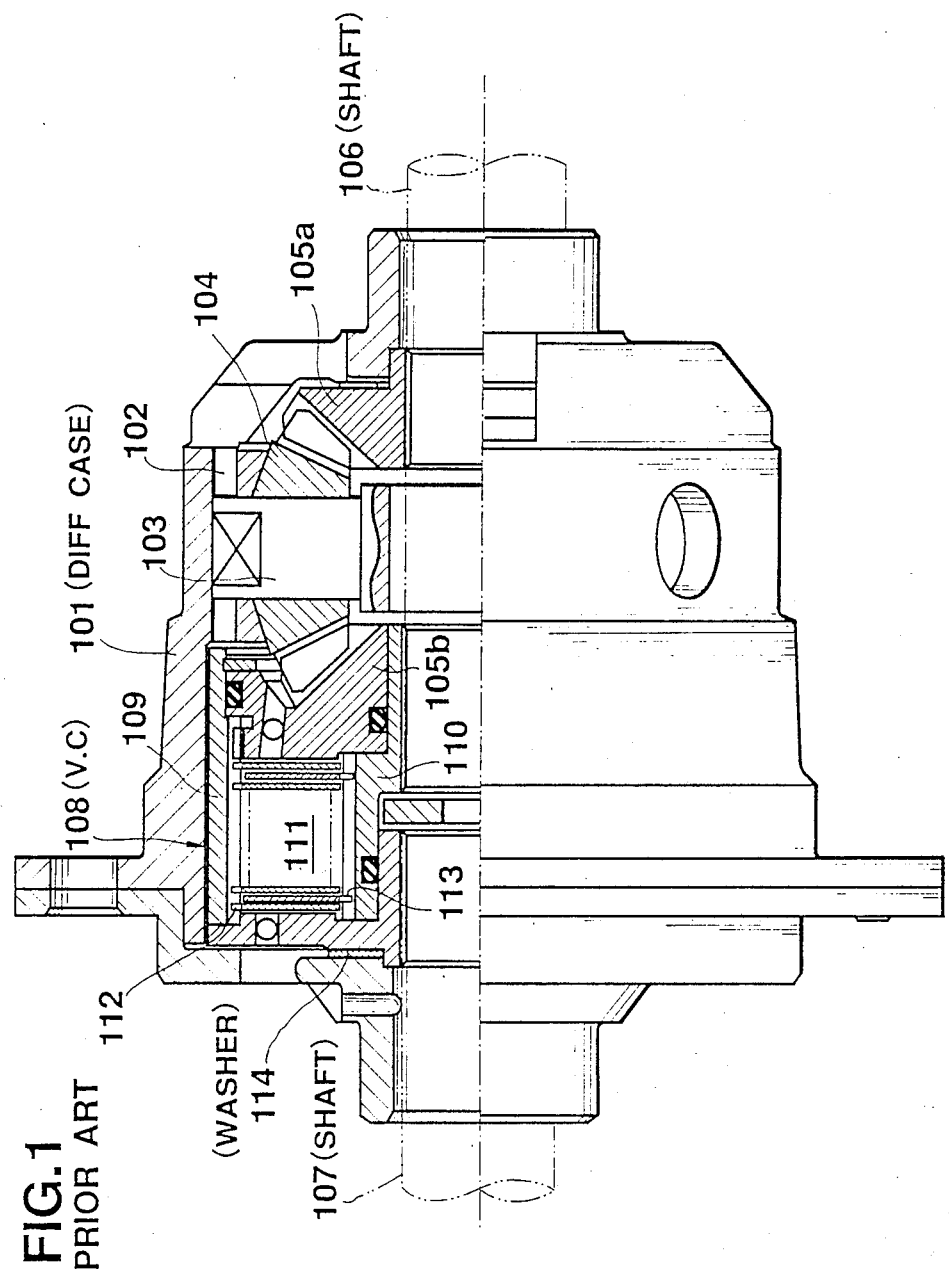
FIG. 1 is a cross-sectional view showing a prior-art differential gear apparatus provided with a differential limitation mechanism.
Figure 2:
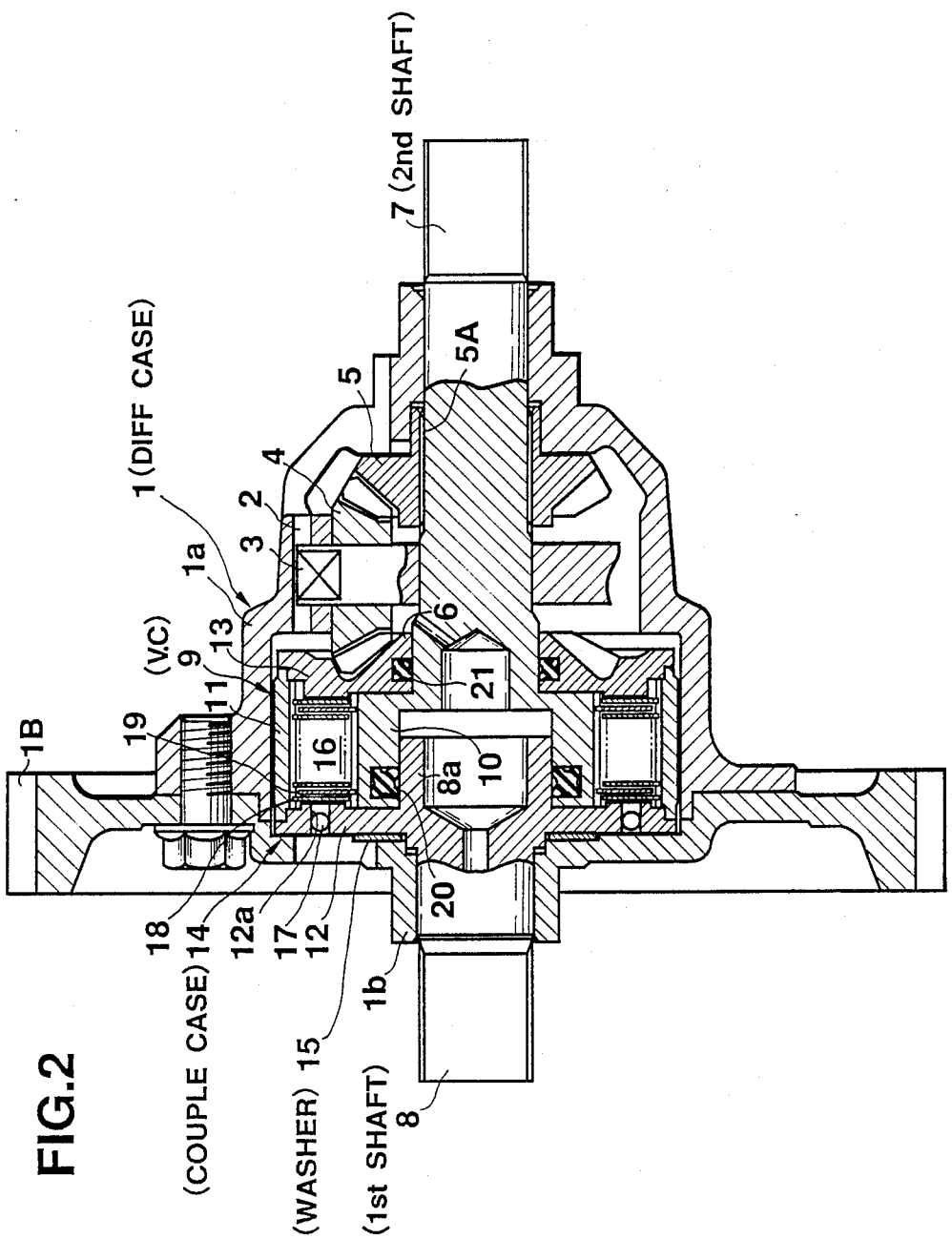
FIG. 2 is a cross-sectional view showing one embodiment of the differential gear apparatus provided with a differential limitation mechanism according to the present invention.

FIG. 2 shows an embodiment of the differential gear apparatus provided with a differential limitation mechanism according to the present invention.

In FIG. 2, a differential case 1 of the apparatus is composed of a case body 1a and a cover 1b. A final reduction gear 1B is formed integral with the cover 1b. An output gear (not shown) to which a rotative force of an internal combustion engine is transmitted is in mesh with the final reduction gear 1B. The differential case 1 is formed with fitting grooves 2 on the inner wall thereof, to which ends of a pinion shaft 3 are fitted. A pinion gear 4 is rotatably supported by the pinion shaft 3. A pair of right and left side gears 5 and 6 are in mesh with the pinion gear 4. The right side gear 5 is formed with splines 5A to be coupled to a right side wheel drive shaft 7 (the second output shaft). This right side wheel drive shaft 7 extends to the left side gear 6. The right side wheel drive shaft 7 is disposed coaxial with a left side wheel drive shaft 8 (the first output shaft). One end of the left side wheel drive shaft 8 is coupled to a wheel and the other end thereof is located within the differential case 1.

A viscous coupling 9 is disposed within the differential case 1 and between the right and left side wheel drive shafts 7 and 8. A roughly cylindrical hub portion 10 whose diameter is larger than that of the right side drive shaft 7 is formed coaxially and integrally with the drive shaft 7 by forging. An outside cylindrical member 11 is disposed on the outer circumference side of the hub portion 10 and on the inner wall side of the differential case 1. A left side wall member 12 and a right side wall member 13 are fixed to both end surfaces of the outside cylindrical member 11. Therefore, a coupling case 14 is composed of the outside cylindrical member 11 and the right and left side wall members 13 and 12. Further, the right side wall member 13 is formed integral with the side gear 6 in mesh with the pinion gear 4. On the other hand, an end portion 8a of the left side wheel drive shaft 8 is fitted to a central hollow of the hub portion 10. The end portion 8a is formed integral with the left side wall member 12 by forging. Further, a washer 15 is interposed between the left side wall member 12 and the differential case 1.

A working chamber 16 is formed by the hub portion 10 and the coupling case 14. The working chamber 16 is filled with a viscous fluid such as silicon oil charged through an inlet 12a formed in the left side wall member 12. The charged viscous fluid is sealed with a steel ball 17. Roughly disk-shaped first resistance plates 18 and roughly disk-shaped second resistance plates 19 are juxtaposed within the working chamber 16. The first resistance plates 18 are circumferentially spline coupled to the outside cylindrical member 11 and the second resistance plates 19 are circumferentially spline coupled to the hub portion 10 in juxtapositional relationship to each other. Further, a sealing member 20 is interposed between the left side wheel drive shaft 8 and the hub portion 10, and another sealing member 21 is interposed between the right side wheel drive shaft 7 and the side gear 6.

The operation of the apparatus thus constructed will be described hereinbelow.

When one of the right and left side vehicle wheels slips during travelling on a road whose surface friction coefficient is small such as a muddy road, the pinion gear 4 revolves round the two output shafts 7 and 8 and further revolves on its own pinion shaft 3 due to the structural feature of the differential gear. Therefore, a differential operation is allowed between the left side wheel drive shaft 8 and the right side wheel drive shaft 7 in relative rotative relationship to each other. When the left side wheel drive shaft 8 and the right side wheel drive shaft 9 rotate relative to each other, since the first resistance plates 18 and the second resistance plate 19 shear the silicon oil, so that shearing resistance is applied to these plates. Therefore, the relative revolution between the left and right side wheel drive shafts 8 and 7 is limited, and thus a rotative force from an internal combustion engine is transmitted to the other non-slipping vehicle wheel to get the vehicle by the non-slipping wheel out of the slipping condition.

Here, when the relative revolution between the right and left side wheel drive shafts 7 and 8 continues for a little while, since the silicon oil is left sheared by the first and second resistance plates 18 and 19, the silicon oil is heated to a high temperature and therefore expanded, so that a high pressure is generated within the working chamber 16 with a result that the left side wall member 12 is urged against the differential case 1.

In this embodiment, however, since the left side wall member 12 is fixed to the outside cylindrical member 11 and additionally formed integral with the left side wheel drive shaft 8, the rigidity of the left side wall member 12 is improved high. Therefore, if being urged against the differential case 1, the left side wall member 12 will not be elastically deformed. That is, the washer 15 interposed between the differential case 1 and the left side wall member 12 will not be urged against the differential case 1 into heat seizure, so that a smooth relative rotation between the differential case 1 and the left side wall member 12 can be kept maintained.

As described above, according to the present invention, since the first output shaft 8 is formed integral with the coupling case 14 and further the second output shaft 7 is formed integral with the inner hub 10, even when the viscous fluid is sheared between the first and second resistance plates 18 and 19, the coupling case 14 will not be elastically deformed into expansion. Therefore, if the coupling case 14 is disposed within the differential case 1 via the washer 15, the washer will not be urged against the differential case into seizure. It is possible to maintain smooth relative revolution between the coupling case 14 and the differential case 1.

What is claimed is:

1. A differential gear apparatus provided with a differential limitation mechanism having a differential case for receiving a rotative input power; a pinion gear rotatably supported by the differential case via a pinion shaft; a pair of side gears in mesh with the pinion gear; a coupling case rotatable together with one of the side gears to transmit rotative power to a first output shaft; an inner hub disposed rotatably relative to the coupling case; a working chamber partitioned by the inner hub and the coupling case and filled with a viscous fluid;

two sets of resistance plates engaged with the coupling case and the inner hub, respectively; and a second output shaft coupled to the other of the side gear, wherein said coupling case is formed as one piece with said first output shaft to increase rigidity of said coupling case.

2. The differential gear apparatus of claim 1, wherein said inner hub is further formed as one piece with said second output shaft to increase rigidity of said inner hub.

3. The differential gear apparatus of claim 1, which further comprises a washer interposed between said differential case and said coupling case.

* * * * *